United States Patent
Xiang (10) Patent No.: US 12,491,757 B1
(45) Date of Patent: Dec. 9, 2025

(54) TWO-WAY FOLDABLE PICKUP TRUCK BOX COVER

(71) Applicant: Ruifang Xiang, Riverside, CA (US)

(72) Inventor: Ruifang Xiang, Riverside, CA (US)

( * ) Notice: Subject to any disclaimer, the term of this patent is extended or adjusted under 35 U.S.C. 154(b) by 0 days.

(21) Appl. No.: 19/218,173

(22) Filed: May 23, 2025

(51) Int. Cl.
*B60J 7/14* (2006.01)
*B60J 7/19* (2006.01)

(52) U.S. Cl.
CPC ............. *B60J 7/141* (2013.01); *B60J 7/198* (2013.01)

(58) Field of Classification Search
CPC ... B60J 7/14; B60J 7/141; B60J 7/1607; B60J 7/198
USPC ............................ 296/100.02, 100.06, 100.09
See application file for complete search history.

(56) References Cited

U.S. PATENT DOCUMENTS

| | | | |
|---|---|---|---|
| 5,595,417 A * | 1/1997 | Thoman | B60J 7/102 |
| | | | 292/213 |
| 5,931,521 A * | 8/1999 | Kooiker | B60J 7/141 |
| | | | 296/100.09 |
| 7,735,881 B2 * | 6/2010 | Steffens | B60J 7/141 |
| | | | 292/DIG. 31 |
| 8,690,224 B2 | 4/2014 | Maimin et al. | |
| 10,994,648 B1 * | 5/2021 | Luo | B60P 7/02 |
| 2009/0236870 A1 * | 9/2009 | Duncan | B60J 7/20 |
| | | | 296/136.04 |
| 2010/0219658 A1 * | 9/2010 | Steffens | B60J 7/141 |
| | | | 24/457 |
| 2025/0018776 A1 * | 1/2025 | Copp | B60J 7/141 |

* cited by examiner

*Primary Examiner* — Jason S Daniels
(74) *Attorney, Agent, or Firm* — Che-Yang Chen; Law Office of Michael Chen (57) ABSTRACT

A two-way foldable pickup truck box cover includes a cover having a plurality of sequentially connected rigid panels configured to cover a truck bed; a pair of main bracket assembly mounted along side rails of the truck bed; and at least one auxiliary bracket configured to secure a selected rigid panel to the main bracket via a slot track located on auxiliary bracket; wherein the cover is configured to be folded in multiple directions, including a rear to front folding direction, a front to rear folding direction and a front and rear ends toward the center folding direction.

20 Claims, 12 Drawing Sheets

TWO-WAY FOLDABLE PICKUP TRUCK BOX COVER

FIELD OF THE DISCLOSURE

The present disclosure relates to truck bed covers, and more particularly to foldable hard covers for pickup truck beds that provide multi-directional folding capabilities for enhanced cargo accessibility.

BACKGROUND OF THE DISCLOSURE

Pickup trucks are widely utilized for their versatility and cargo-carrying capabilities. Various types of bed covers have been developed to protect the contents of the truck bed from environmental elements and theft. Among these, foldable hard covers are popular due to their durability and ease of use. However, conventional foldable truck bed covers are typically designed to fold in only one direction, usually from the rear of the vehicle toward the cab.

This unidirectional folding design presents several limitations. For instance, accessing cargo near the front of the truck bed requires the user to fold multiple panels from the rear, which can be inconvenient and time-consuming. Additionally, in situations where the rear of the vehicle is obstructed or when quick access from the side is needed, the single-direction folding mechanism proves inadequate. The lack of flexibility in folding direction restricts the user's ability to efficiently load and unload items, especially in dynamic work environments where access points may vary.

Furthermore, existing designs often incorporate fixed hinge systems and integrated drainage channels within the rail structures. While these features enhance durability and water management, they can complicate installation, increase manufacturing costs, and limit compatibility with different truck models.

In light of these challenges, there is a need for an improved truck bed cover that offers greater flexibility and user convenience. The present invention addresses these issues by introducing a two-way foldable pickup truck box cover. This innovative design allows the cover to be folded from rear to front, front to rear, and from both ends toward the center, providing multiple access points to the truck bed. The system employs a novel bracket assembly and locking mechanism that facilitates secure and stable folding in multiple directions, enhancing functionality without relying on traditional drainage systems or fixed hinge configurations.

All referenced patents, applications, and literature are incorporated herein by reference. Furthermore, where a definition or use of a term in a reference, which is incorporated by reference herein, is inconsistent or contrary to the definition of that term provided herein, the definition of that term provided herein applies, and the definition of that term in the reference does not apply. The disclosed embodiments may seek to satisfy one or more of the desires mentioned above. Although the present embodiments may obviate one or more of the desires mentioned above, it should be understood that some aspects of the embodiments might not necessarily obviate them.

BRIEF SUMMARY OF THE DISCLOSURE

In a general implementation, a two-way foldable pickup truck box cover may comprise a cover having a plurality of sequentially connected rigid panels configured to cover a truck bed; a pair of main bracket assembly mounted along side rails of the truck bed; and at least one auxiliary bracket configured to secure a selected rigid panel to the main bracket assembly via a slot track located on auxiliary bracket; wherein the cover is configured to be folded in multiple directions, including a rear to front folding direction, a front to rear folding direction and a front and rear ends toward the center folding direction.

In another aspect, combinable with the general implementation, wherein each of the plurality of rigid panels is individually lockable onto the main bracket assembly through the corresponding auxiliary bracket.

Among the many possible implementations of the two-way foldable pickup truck box cover, wherein the auxiliary bracket is configured to be secured to the main bracket assembly via at least one screw and comprises a truck lock slot configured to receive an inner box edge of the truck bed.

Further, it is contemplated that the auxiliary bracket comprises a first auxiliary bracket member having a slot track and at least one elongated first securing slot, a second auxiliary bracket member having a truck lock slot and at least one elongated second securing slot, and at least one screw passing through the elongated first securing slot and the elongated second securing slot to secure the auxiliary bracket on the main bracket assembly.

In the alternative, each rigid panel comprises a locking pin configured to selectively move forward or backward and selectively insert into the slot track to lock each rigid panel with the auxiliary bracket.

It is still further contemplated that each rigid panel comprises a locking pin and at least one rotatable pin lock assembly with a single rotary actuator to be rotated for engaging or disengaging locking pins of at least two adjacent rigid panels with the slot tracks simultaneously.

In another aspect combinable with the general implementation, the plurality of sequentially connected rigid panels comprises a frontmost panel comprising a front mechanical lock configured to selectively lock the frontmost panel with the auxiliary bracket, a middle panel comprising a middle mechanical lock configured to lock the middle panel with the auxiliary bracket selectively, and a rearmost panel comprising a rear mechanical lock configured to lock the rear panel with the auxiliary bracket selectively.

In another aspect combinable with the general implementation, the plurality of sequentially connected rigid panels comprises a frontmost mechanical lock, a middle mechanical lock, and a rear mechanical lock, wherein each of the frontmost mechanical lock, the middle mechanical lock, and the rear mechanical lock comprises one retaining portion slidably coupled with the rigid panel and a locking hook configured to lock into the slot track selectively.

In another aspect combinable with the general implementation, the plurality of sequentially connected rigid panels is formed as a series of sequential panels and comprises a frontmost panel, a rearmost panel located at the opposite side of the frontmost panel, and a middle panel located between the frontmost panel and the rearmost panel.

In another aspect combinable with the general implementation, during the rear to front folding direction, wherein a frontmost panel is locked on the auxiliary bracket and the remaining of the plurality of sequentially connected rigid panels are foldable in sequence towards the frontmost panel and configured to overlay one another to stack atop the locked frontmost panel.

In another aspect combinable with the general implementation, during the rear-to-front folding direction, wherein a locking hook of the frontmost mechanical lock is secured into the slot track and locking hooks of a middle mechanical lock and a rearmost mechanical lock are not secured into the corresponding slot track.

In another aspect combinable with the general implementation, during the front and rear ends toward the center folding direction, wherein a middle panel is locked on the auxiliary bracket and the remaining of the plurality of sequentially connected rigid panels are foldable to sequentially overlap toward the middle panel from opposite directions.

In another aspect combinable with the general implementation, during the front and rear ends toward the center folding direction, wherein a locking hook of the middle mechanical lock is secured into the slot track and locking hooks of a frontmost mechanical lock and a rearmost mechanical lock are not secured into the corresponding slot tracks.

In another aspect combinable with the general implementation, during the front-to-rear folding direction, wherein the rearmost panel is locked on the auxiliary bracket and the remaining of the plurality of sequentially connected rigid panels are foldable in sequence towards the rearmost panel and configured to overlay one another to stack atop the locked rearmost panel.

In another aspect combinable with the general implementation, during front-to-rear folding direction, wherein a locking hook of the rearmost mechanical lock is secured into the slot track and locking hooks of a middle mechanical lock and a frontmost mechanical lock are not secured into the corresponding slot track.

In another aspect, which is combinable with the general implementation, the rear-to-front folding direction and the front-to-rear folding direction are opposite.

In another aspect combinable with the general implementation, during the rear to front folding direction, wherein a locking pin arranged on a frontmost panel is slid to be inserted into a bottom slot track to secure the frontmost panel on with the auxiliary bracket.

In another aspect combinable with the general implementation, during front and rear ends toward the center folding direction, wherein a locking pin arranged on a middle panel is slid to be inserted into the slot track to secure the middle panel with the auxiliary bracket.

In another aspect combinable with the general implementation, during the front-to-rear folding direction, wherein a locking pin arranged on the rearmost panel is slid to be inserted into a bottom slot track to secure the rearmost panel with the auxiliary bracket.

In another aspect combinable with the general implementation, the cover does not include any integrated water drainage channel or pipe structure within the main bracket assembly.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, operations, methods, or processes described herein may include more or fewer steps than those described. Further, the steps in such example operations, methods, or processes may be performed in different successions than those described or illustrated in the figures. Accordingly, other implementations are within the scope of the following claims.

The details of one or more implementations of the subject matter described in this disclosure are outlined in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be on a precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more", and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

Figure 1:
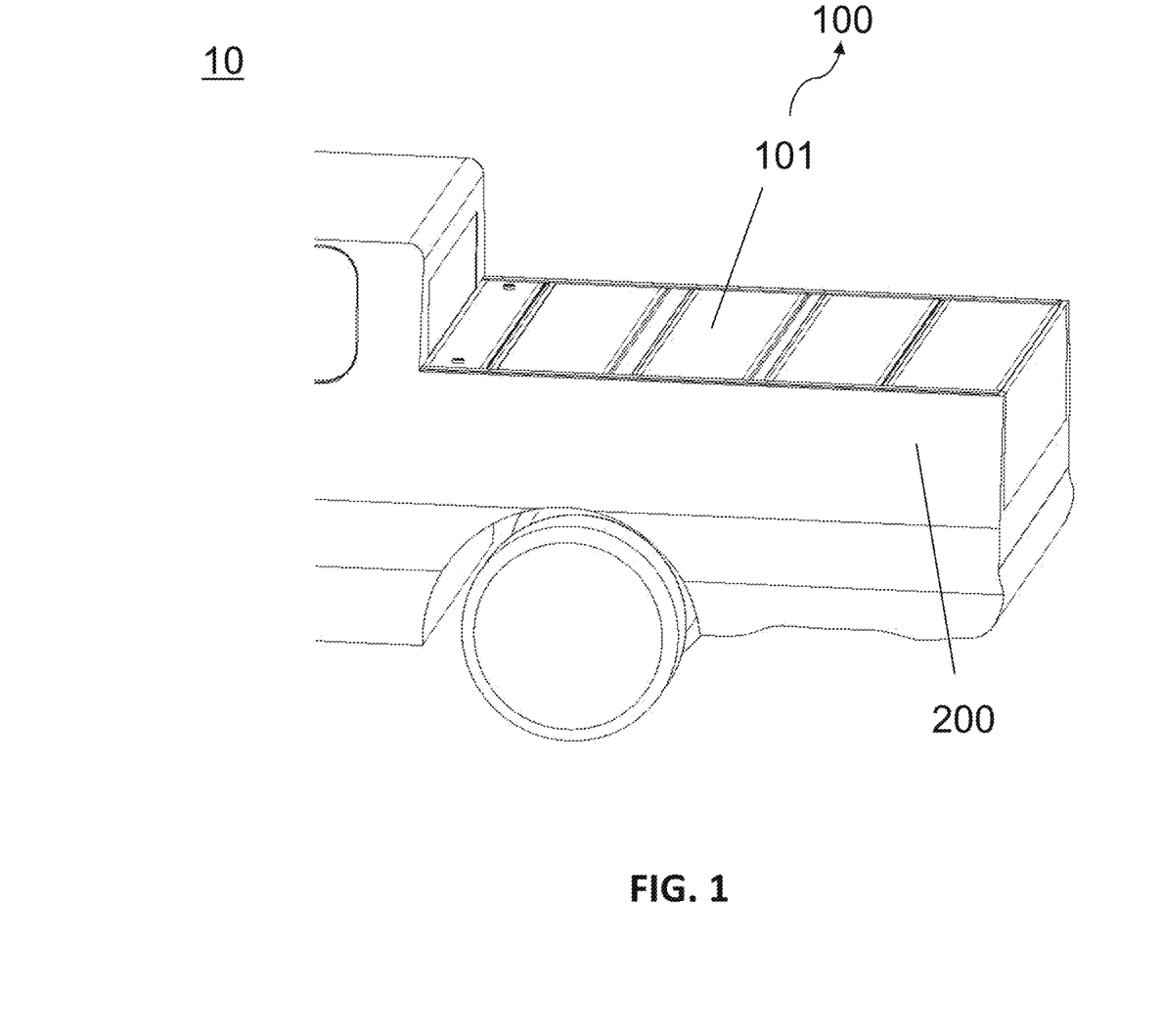
FIG. 1 is a perspective view of a two-way foldable pickup truck box cover according to an aspect of the embodiment.
Figure 2:
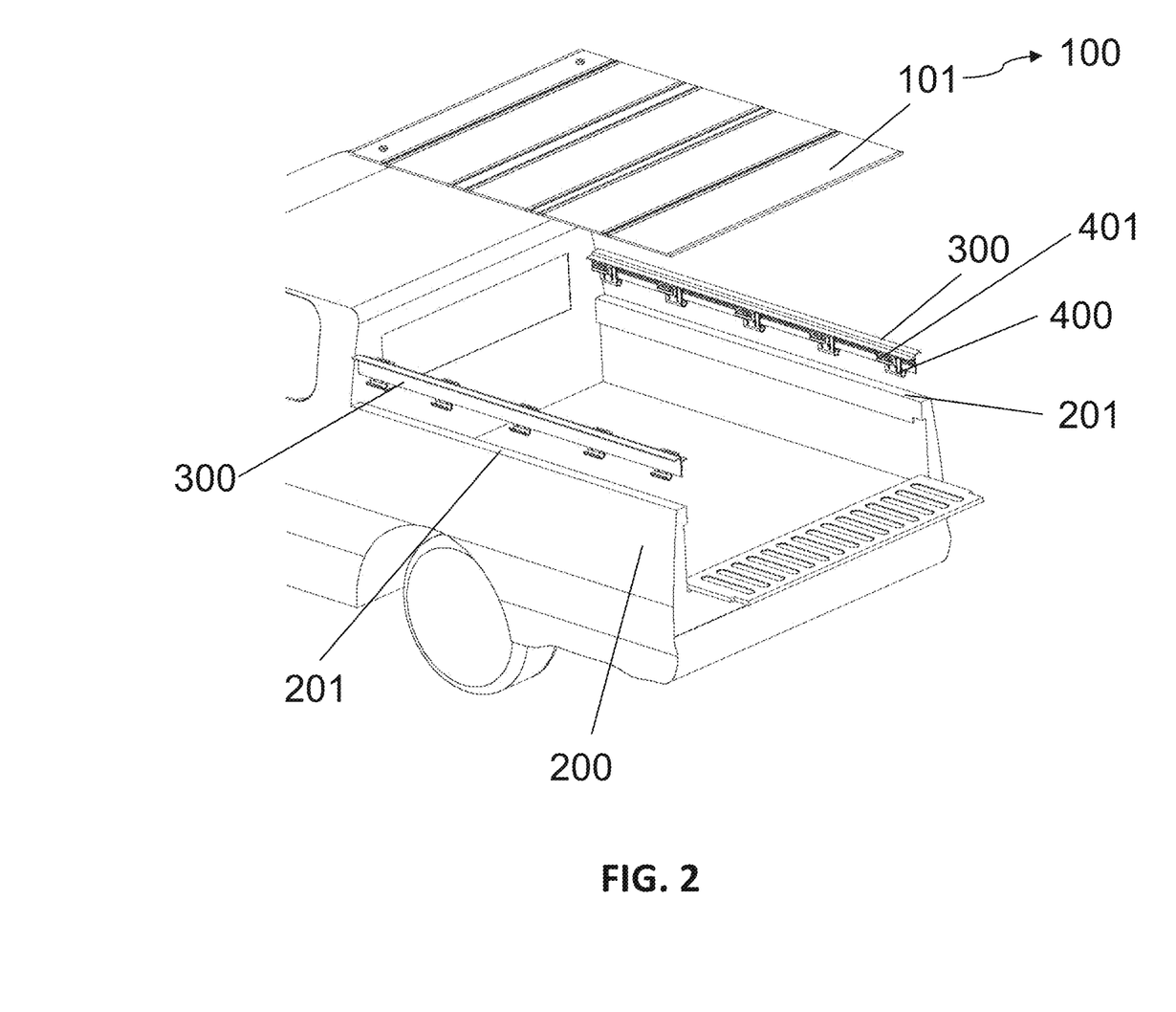
FIG. 2 is an exposed view of the two-way foldable pickup truck box cover according to an aspect of the embodiment.

FIGS. 1-2 generally depict a two-way foldable pickup truck box cover according to an aspect of the embodiments.

Referring to FIG. 1 and FIG. 2, the two-way foldable pickup truck box cover 10 may comprise a cover 100 having a plurality of sequentially connected rigid panels 101 configured to cover a truck bed 200.

In some embodiments, the two-way foldable pickup truck box cover 10 may comprise a pair of main bracket assembly 300 mounted along side rails 201 of the truck bed 200 and at least one auxiliary bracket 400 configured to secure a selected rigid panel 101 with the main bracket assembly 300 via a slot track 401 located on auxiliary bracket 400.

FIGS. 3A-4B generally depicts the two-way foldable pickup truck box cover according to an aspect of the embodiments.

Figure 3A:
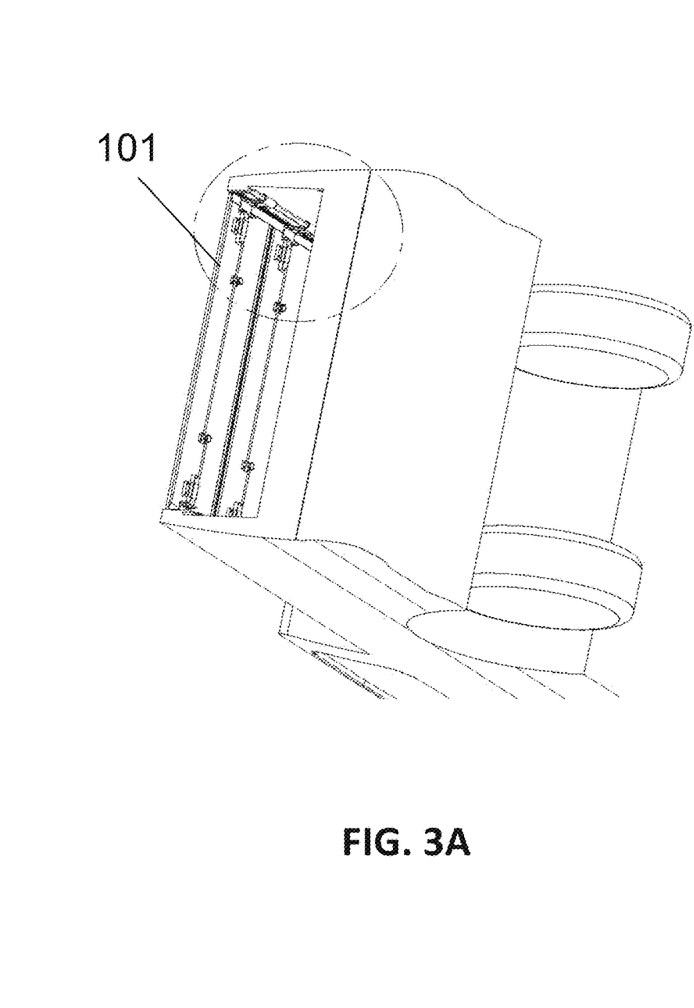
FIG. 3A is a bottom perspective view of the two-way foldable pickup truck box cover according to an aspect of the embodiment.
Figure 3B:
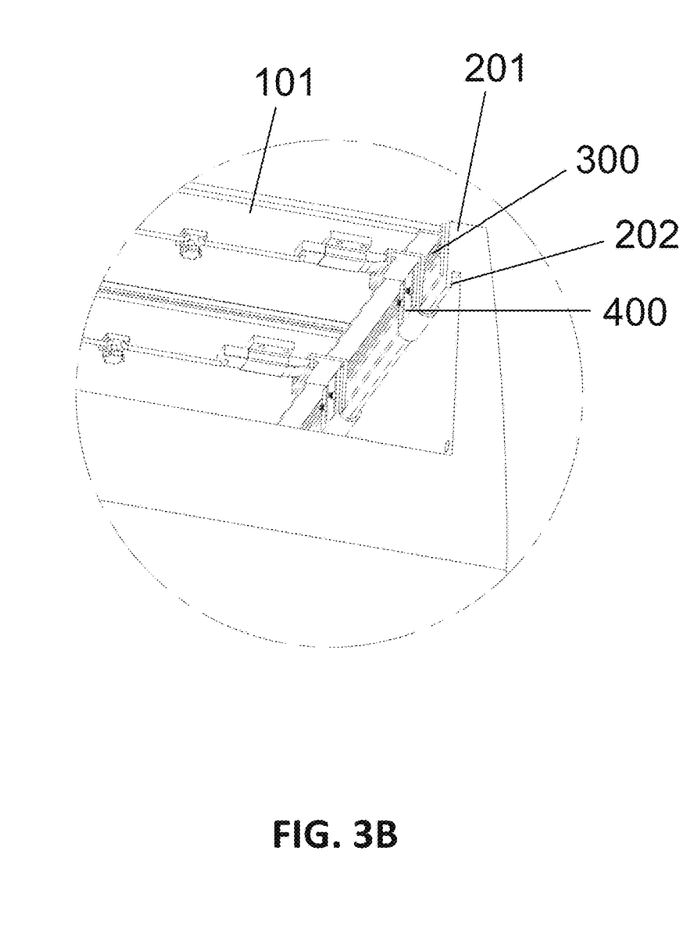
FIG. 3B is a sectional view of the two-way foldable pickup truck box cover according to an aspect of the embodiment.

FIGS. 3A to 3B, each of the plurality of rigid panels 101 may be individually lockable onto the main bracket assembly 300 through the corresponding auxiliary bracket 400.

Figure 4A:
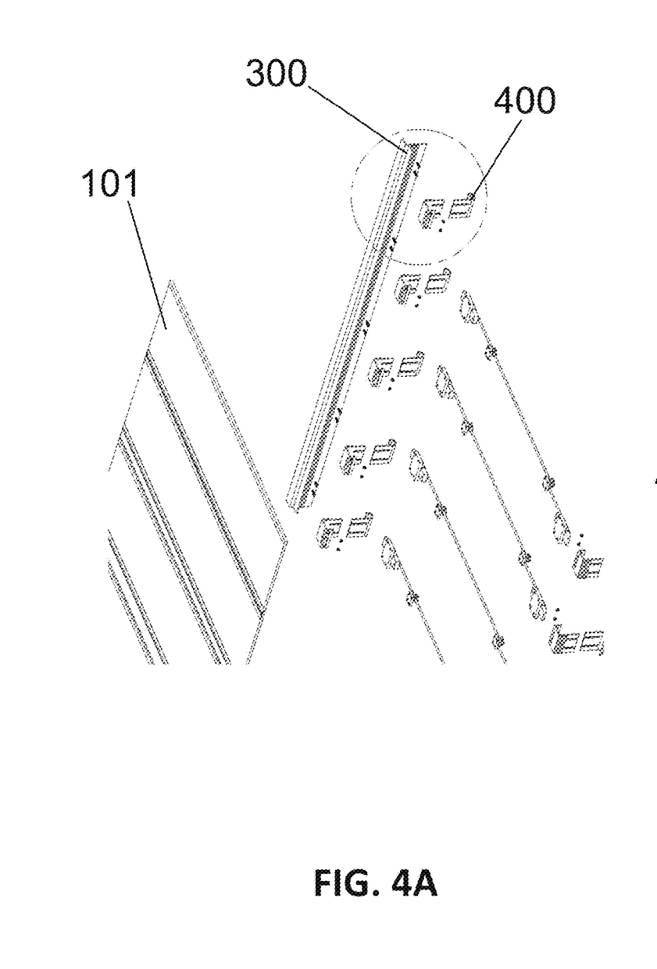
FIG. 4A is another exposed view of the two-way foldable pickup truck box cover according to an aspect of the embodiment.
Figure 4B:
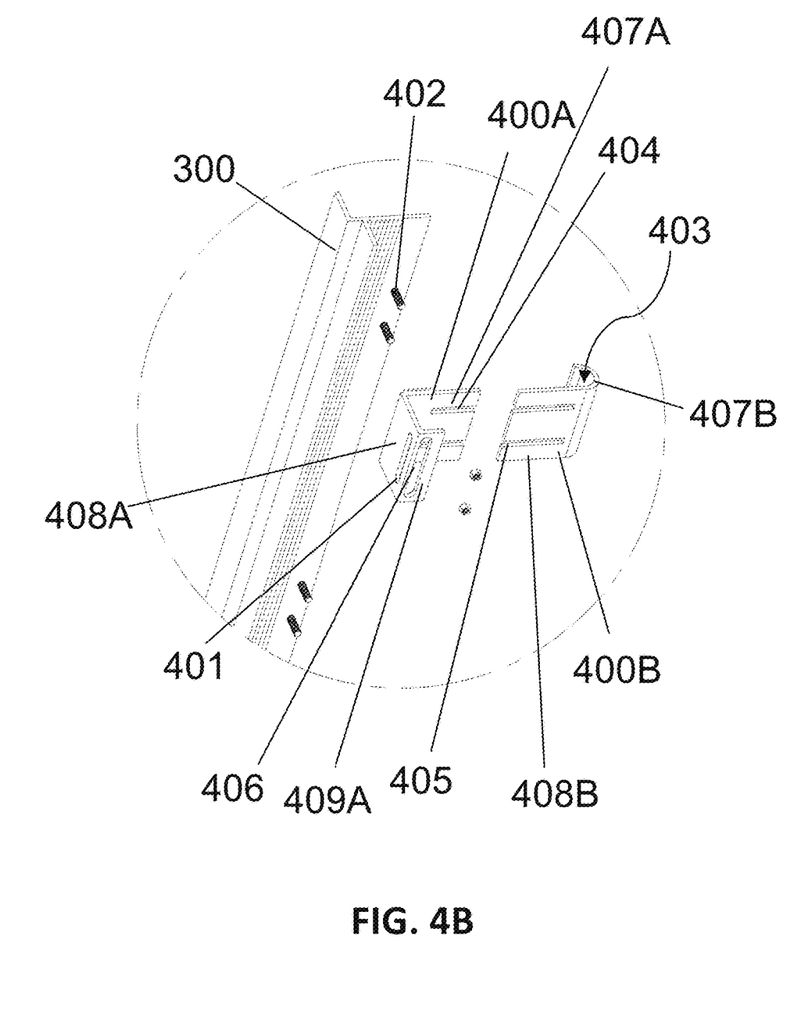
FIG. 4B is another sectional view of the two-way foldable pickup truck box cover according to an aspect of the embodiment.

Continuing to FIG. 4A to 4B, the auxiliary bracket 400 is configured to be secured to the main bracket assembly 300 via at least one screw 401 and comprises a truck lock slot 403 configured to receive an inner box edge 202 of the truck bed 200 (shown in FIG. 3B).

In some embodiments, the auxiliary bracket 400 may comprise a first auxiliary bracket member 400A having the slot track 402 and at least one elongated first securing slot 404, a second auxiliary bracket member 400B having the truck lock slot 403 and at least one elongated second securing slot 405, and at least one screw 402 passing through the elongated first securing slot 404 and the elongated second securing slot 405 to secure the first auxiliary bracket 400A and the second auxiliary bracket 400B on the main bracket assembly 300. It should be noted that, in some embodiments, the slot track 401 may be formed on one end portion 408A of the first auxiliary bracket 400A and at least one elongated first securing slot 404 may be formed on the opposite end portion 407A of the first auxiliary bracket 400A, wherein the truck lock slot 403 may be formed on one end portion 407B of the second auxiliary bracket 400B and at least one elongated second securing slot 405 formed on the opposite end portion 408B of the second auxiliary bracket member 400B, and at such a situation, the opposite end portion 407A of the first auxiliary bracket 400A and the opposite end portion 408B of the second auxiliary bracket 400B may overlappedly arranged with each other, wherein the elongated first securing slot 404 and the elongated second securing slot 405 may be overlappedly arranged with each other for allowing the screw 402 passing therethrough at the same time, and in such a way, the first auxiliary bracket 400A and the second auxiliary bracket 400B may be secured with each other and secured with the main bracket assembly 300. It should be noted that the first auxiliary bracket 400A and the second auxiliary bracket 400B are two separate members.

In still some embodiments, the first auxiliary bracket 400A may comprise a downward portion 409A that protrudes downward from the one end portion 408A of the first auxiliary bracket 400A and a bottom slot track 406 formed on the downward portion and arranged adjacent to the slot track 401.

Figure 5:
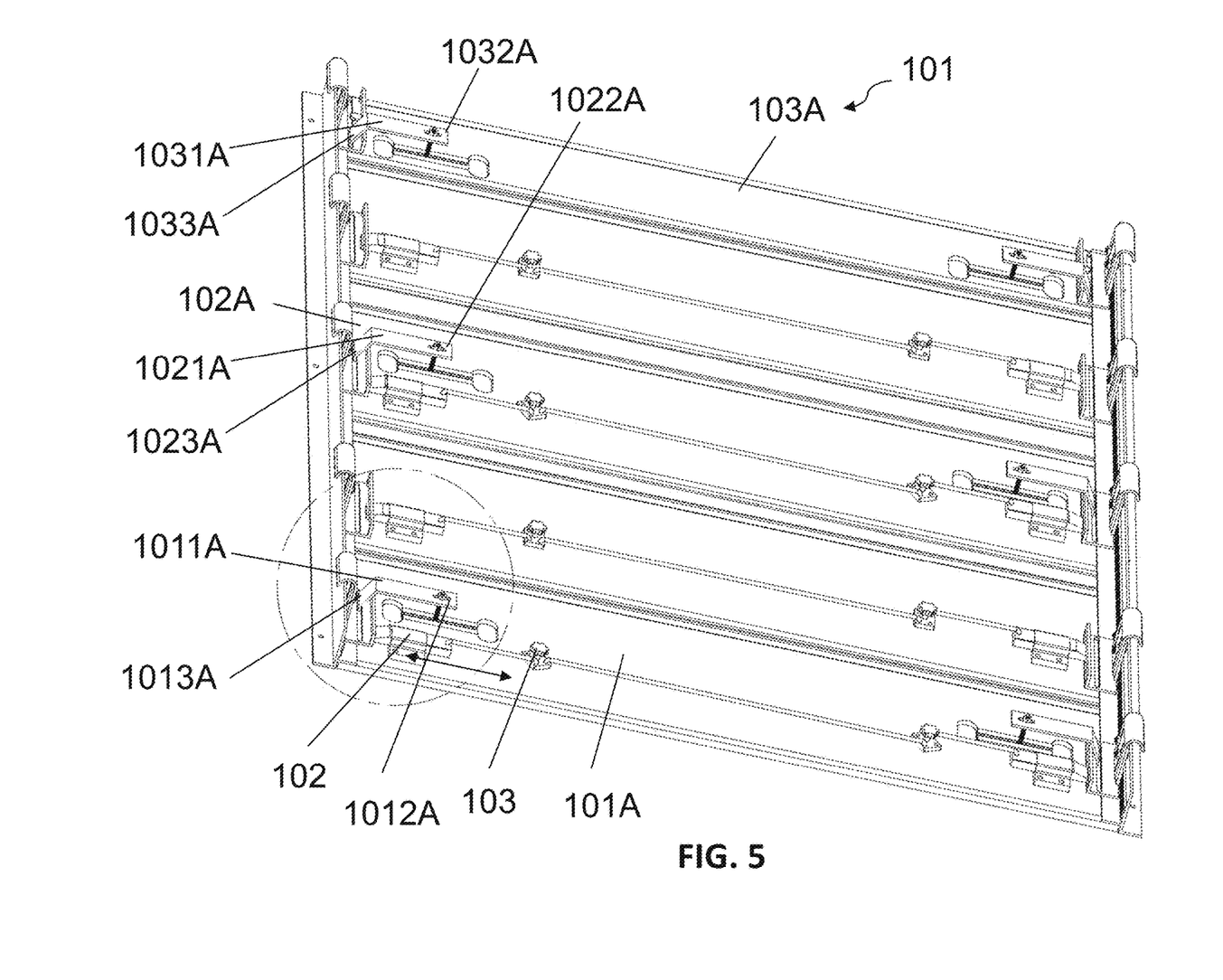
FIG. 5 is a bottom view of the two-way foldable pickup truck box cover according to an aspect of the embodiment.
Figure 6:
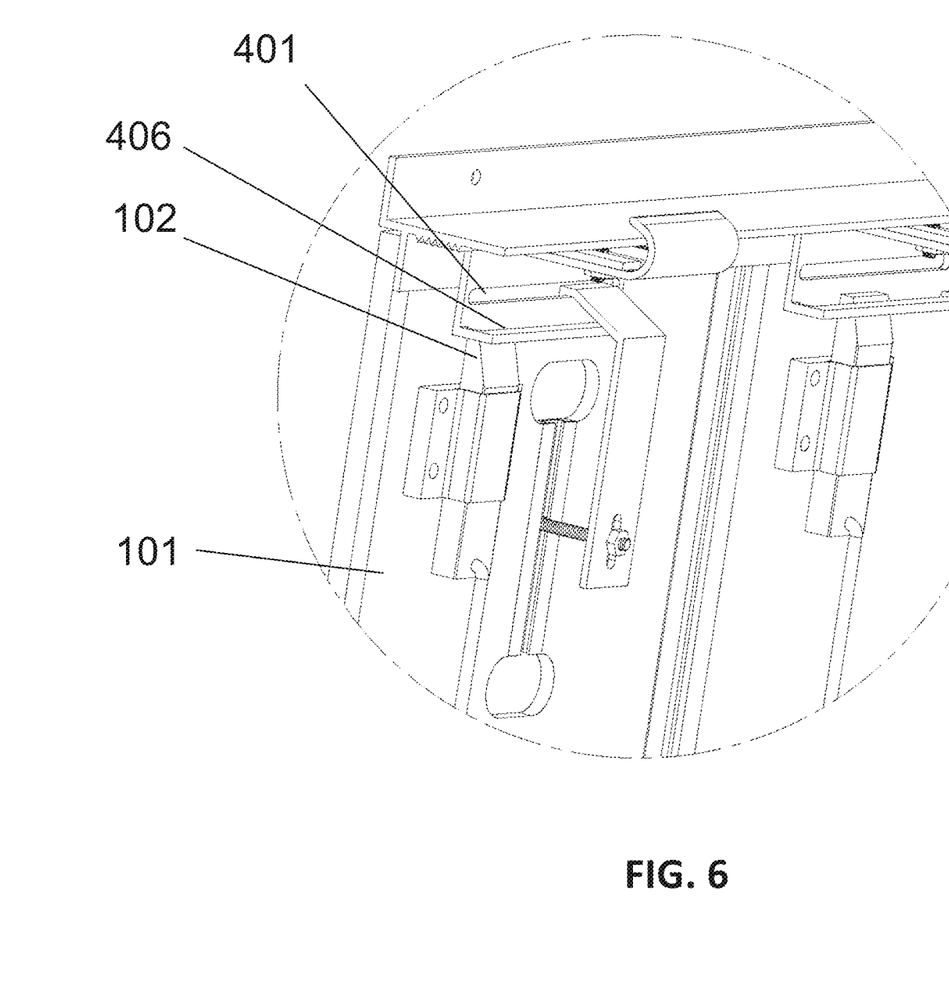
FIG. 6 is an enlarged section view of FIG. 5 according to an aspect of the embodiment.

FIGS. 5-6 generally depict the two-way foldable pickup truck box cover according to an aspect of the embodiments.

Referring to FIG. 5 and FIG. 6, in some embodiments, each rigid panel 101 comprises a locking pin 102 configured to selectively move forward or backward and selectively insert into the bottom slot track 406 for locking each rigid panel 101 with the auxiliary bracket 400.

In still some embodiments, each rigid panel 101 may comprise a locking pin 102 and at least one rotatable pin lock assembly with a single rotary actuator 103 to be rotated for engaging or disengaging the locking pins 102 of simultaneously with the bottom slot track 406. In other words, it should be noted that, in some embodiments, two slot tracks may be formed on two opposite ends of the rigid panel 101. Two locking pins 102 may be formed on two opposite sides of the single rotary actuator 103. In such a way, the single rotary actuator 103 may be rotated to simultaneously move the two locking pins 102 for selectively engaging or disengaging with the corresponding bottom slot track 406.

Referring to details in FIG. 5 and FIG. 6, in still some embodiments, the plurality of sequentially connected rigid panels 101 may comprise a frontmost panel 101A comprising a front mechanical lock 1011A configured to selectively lock the frontmost panel 101A with the corresponding auxiliary bracket 400, a middle panel 102A comprising a middle mechanical lock 1021A configured to selectively lock the middle panel 102A with the corresponding auxiliary bracket 400, and a rearmost panel 103A comprising a rearmost mechanical lock 1031A configured to selectively lock the rearmost panel 103A with the corresponding auxiliary bracket 400.

In still some embodiments, the plurality of sequentially connected rigid panels 101 may be formed as a series of sequential panels and comprise a frontmost panel 101A, a rearmost panel 103A located at the opposite side of the frontmost panel 101A, and a middle panel 102A located between the frontmost panel 101A and the rearmost panel 103A.

As shown further details in FIG. 5 and FIG. 6, the plurality of sequentially connected rigid panels 101 may comprise a frontmost mechanical lock 1011A, a middle mechanical lock 1021A, and a rearmost mechanical lock 1031A, wherein each of the frontmost mechanical lock 1011A, the middle mechanical lock 1021A, and the rearmost mechanical lock 1031A may comprise a retaining portion 1012A, 1022A, 1032A slidably coupled with an inner surface of the corresponding rigid panels 101A, 102A, 103A and a locking hook 1013A, 1023A, 1033A configured to selectively lock into the corresponding slot track 401. In other words, the each of the locking pins 102 may be arranged on the inner surface of the rigid panel 101, wherein an outer surface of the rigid panel 101 may be exposed outside and formed on the opposite side of the inner surface.

FIG. 7A to FIG. 9B generally depict the two-way foldable pickup truck box cover, showing the cover 100 being configured to be folded in multiple directions, including a rear to front folding direction, a front to rear folding direction and a front and rear ends toward the center folding direction.

Figure 7A:
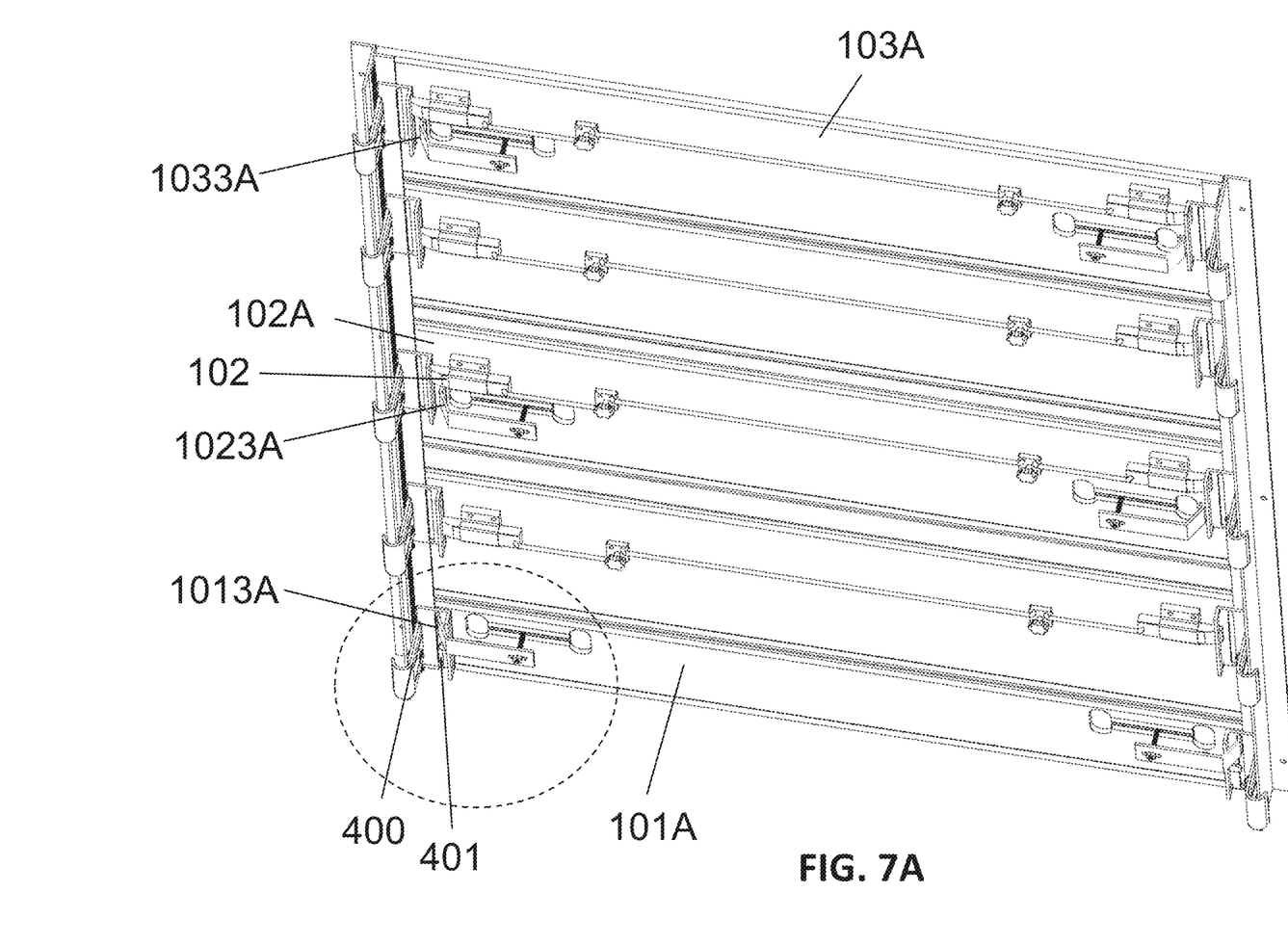
FIG. 7A is a bottom view of the two-way foldable pickup truck box cover, showing the cover in a rear to front folding direction, according to an aspect of the embodiment.
Figure 7B:
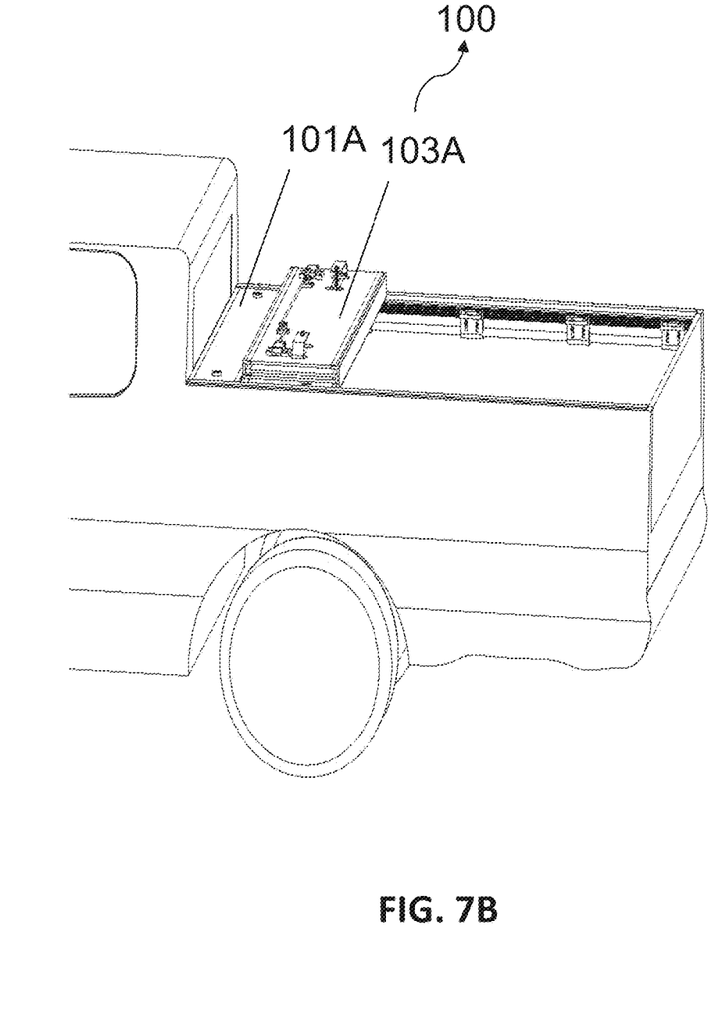
FIG. 7B is a perspective view of the two-way foldable pickup truck box cover, showing the cover in a rear-to-front folding direction, according to an aspect of the embodiment.

Referring to FIGS. 7A to 7B, in some embodiments, the cover 100 may be configured to be folded in the rear to front folding direction, wherein during the rear to front folding direction, wherein the frontmost panel 101A may be locked on the corresponding auxiliary bracket 400 and the remaining of the plurality of sequentially connected rigid panels 102A, 103A may be foldable in sequence towards the frontmost panel 101A and configured to overlay one another to stack atop the locked frontmost panel 101A.

In still some embodiments, during the rear to front folding direction, the locking hook 1013A of the frontmost mechanical lock may be secured into the corresponding slot track 401 and the locking hook 1023A of the middle mechanical lock may not be secured into the corresponding slot track, and the locking hook 1033A of the rearmost mechanical lock may not be secured into the corresponding slot track 401.

In still some embodiments, during the rear to front folding direction, the locking pin 102 arranged on the frontmost panel 101A may be slid to be inserted into the corresponding slot track 401 to secure the frontmost panel 101A with the corresponding auxiliary bracket 400.

Figure 8A:
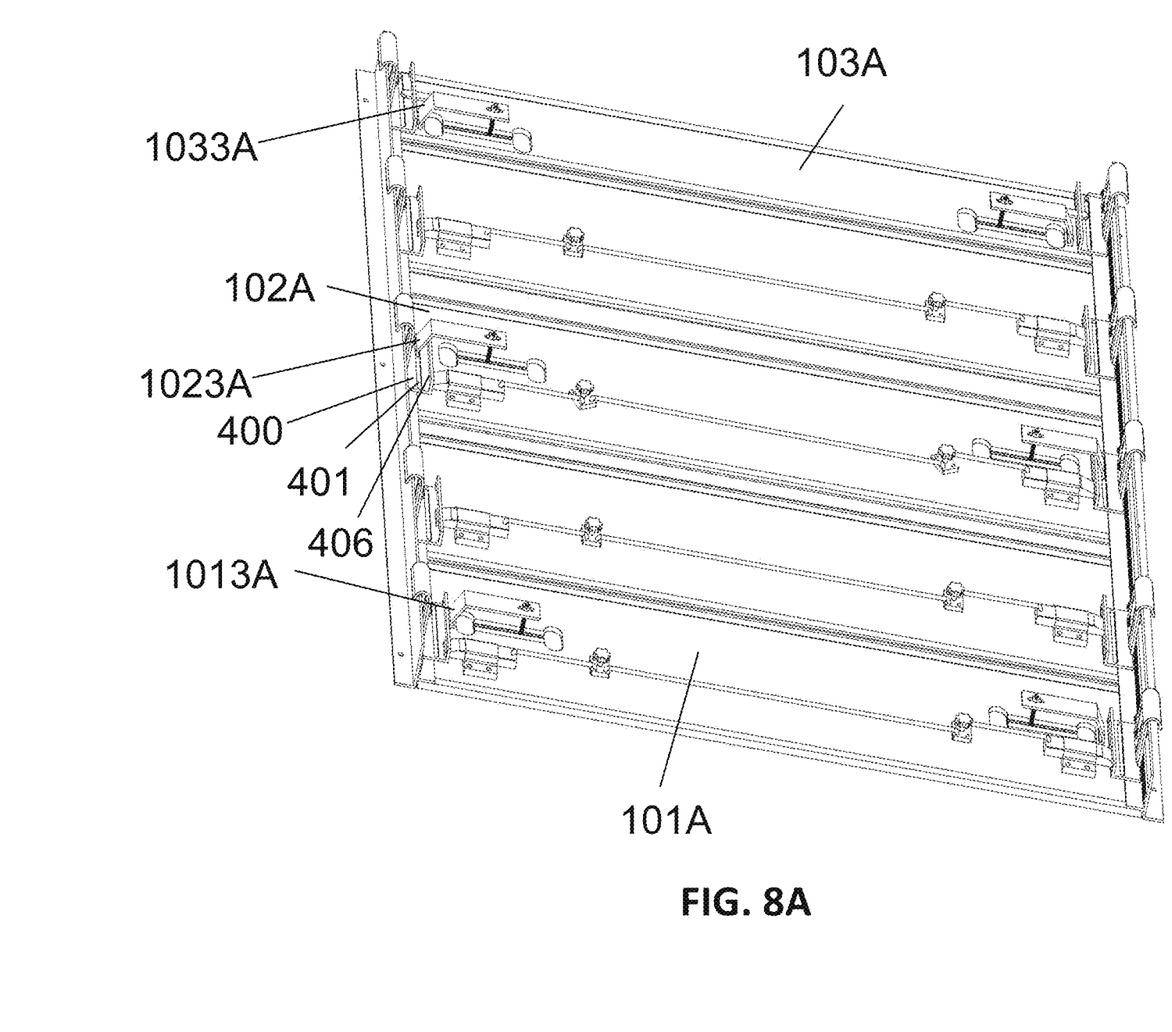
FIG. 8A is a bottom view of the two-way foldable pickup truck box cover, showing the cover in a front and rear ends toward the center folding direction, according to an aspect of the embodiment.
Figure 8B:
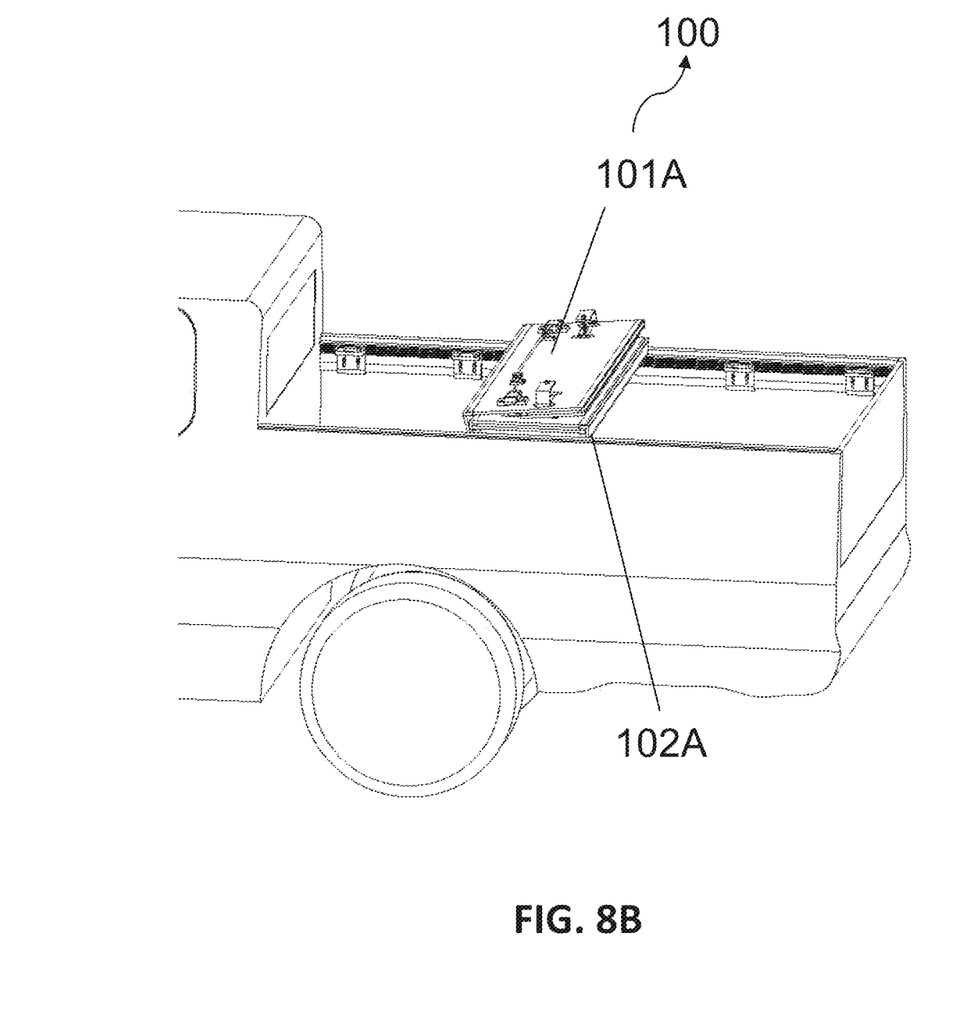
FIG. 8B is a perspective view of the two-way foldable pickup truck box cover, showing the cover in a front and rear ends toward the center folding direction, according to an aspect of the embodiment.

Referring to FIG. 8A to 8B, the cover 100 may be configured to be folded in the front and rear ends toward the center folding direction, wherein during the front and rear ends toward the center folding direction, the middle panel 102A may be locked on the auxiliary bracket 400 and the remaining of the plurality of sequentially connected rigid panels 101A, 103A may be foldable to sequentially overlap toward the middle panel 102A from opposite directions.

In some embodiments, during the front and rear ends toward the center folding direction, the locking hook 1023A of the middle mechanical lock may be secured into the slot track 401 and locking hooks 1013A, 1033A of the frontmost mechanical lock and the rearmost mechanical lock may not be secured into the corresponding slot tracks 401.

In some embodiments, during the front and rear ends toward the center folding direction, wherein the locking pin 102 arranged on the middle panel 102A may be slid to be inserted into the corresponding bottom slot track 406 to secure the middle panel 102A with the auxiliary bracket 400.

Figure 9A:
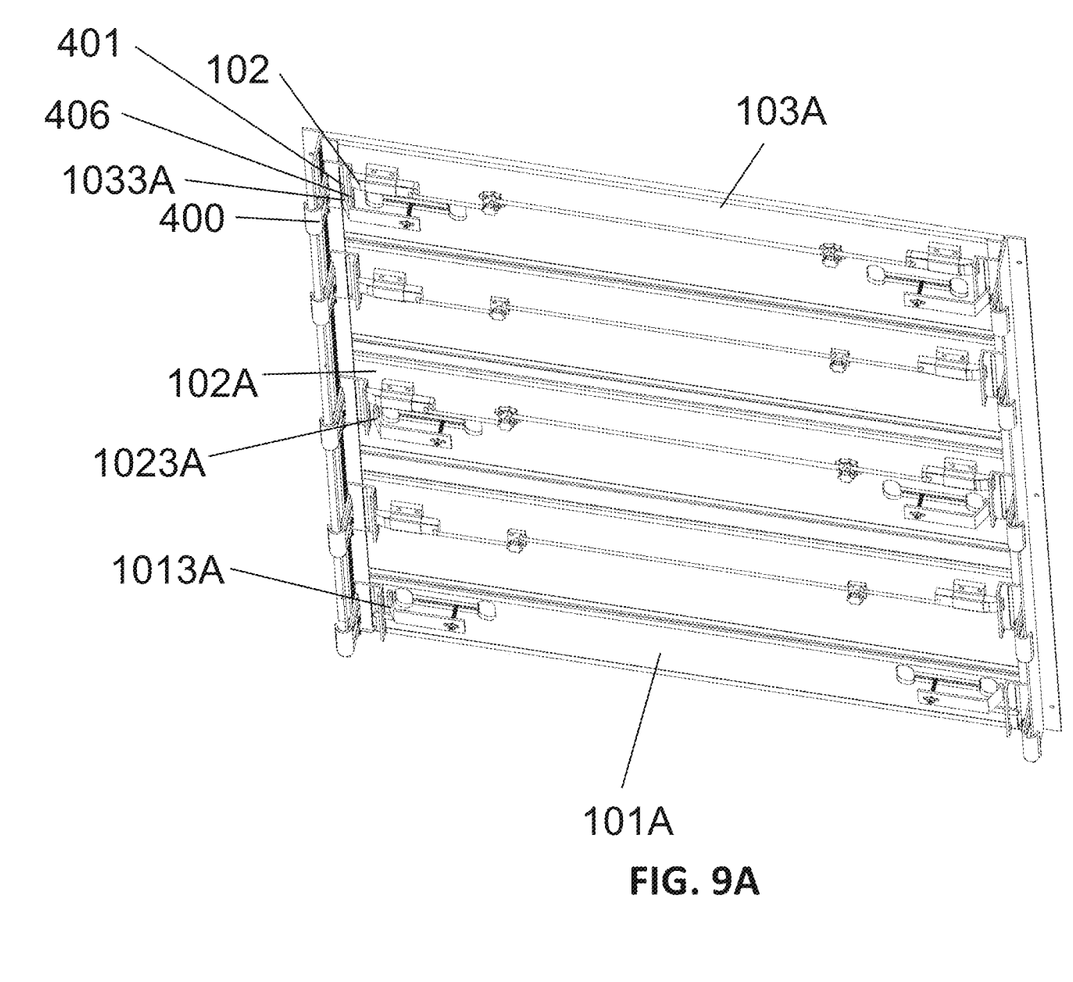
FIG. 9A is a bottom view of the two-way foldable pickup truck box cover, showing the cover in a front to rear folding direction, according to an aspect of the embodiment.
Figure 9B:
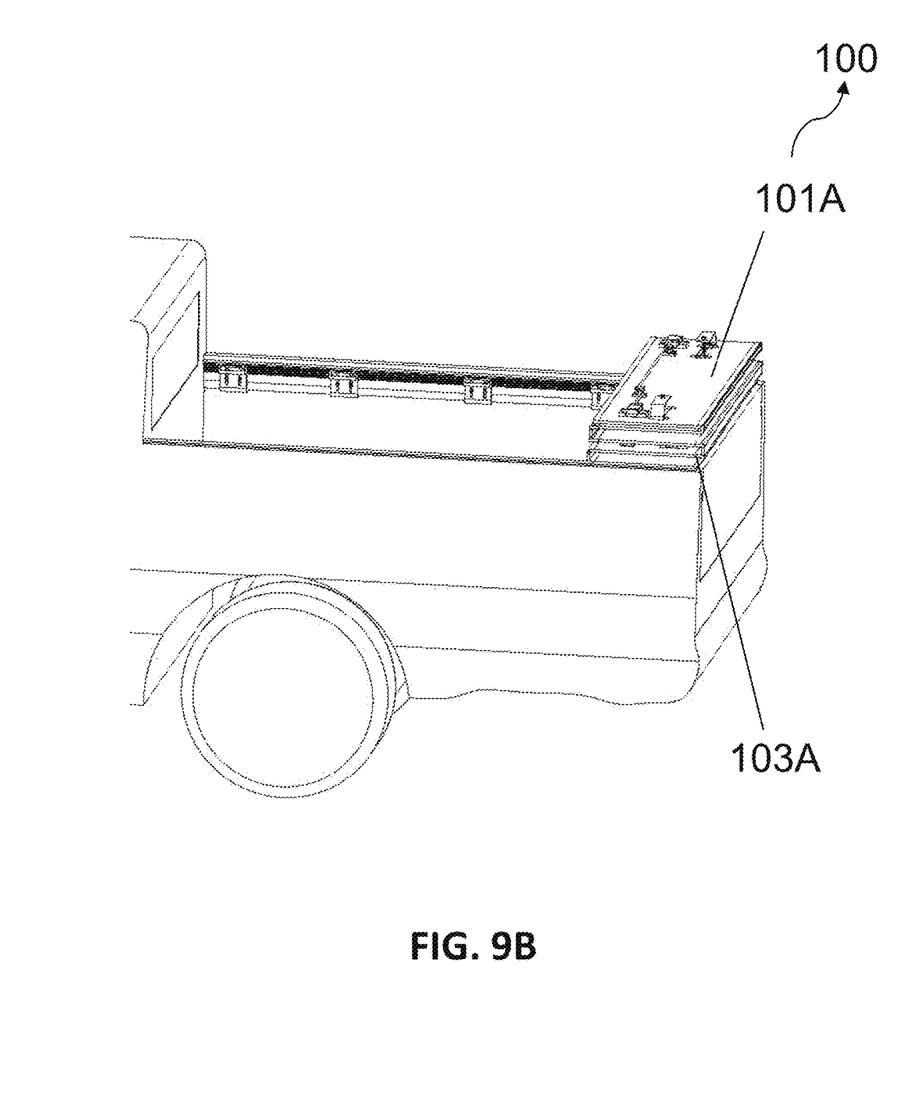
FIG. 9B is a perspective view of the two-way foldable pickup truck box cover, showing the cover in a front to rear folding direction, according to an aspect of the embodiment.

Referring to FIG. 9A and FIG. 9B, in some embodiments, during the front-to-rear folding direction, wherein the rearmost panel 103A may be locked on the corresponding auxiliary bracket 400 and the remaining of the plurality of sequentially connected rigid panels 102A, 101A may be foldable in sequence towards the rearmost panel 103A and configured to overlay one another to stack atop the locked rearmost panel 103A.

In some embodiments, during the front to rear folding direction, the locking hook 1033A of the rearmost mechanical lock may be secured into the corresponding slot track 401 and locking hooks 1023A, 1013A of the middle mechanical lock and the frontmost mechanical lock may not be secured into the corresponding slot track 401.

In still some embodiments, during the front to rear folding direction, the locking pin 1402 arranged on the rearmost panel 103A may be slid to be inserted into the corresponding slot track 401 to secure the rearmost panel 103A with the auxiliary bracket 400.

It should be noted that, in some embodiments, the rear-to-front folding direction and the front-to-rear folding direction are two opposite directions.

It should be noted that, in some embodiments, the cover does not include any integrated water drainage channel or pipe structure within the main bracket assembly.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of a two-way foldable pickup truck box cover have been disclosed. It should be apparent, however, to those skilled in the art that many more modifications besides those already described are possible without departing from the disclosed concepts herein. The disclosed embodiments, therefore, are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be substituted, and what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but also to include, by special definition in this specification, structure, material, or acts beyond the scope of the commonly defined meanings. Thus, if an element can be understood in this specification as including more than one meaning, its use in a claim must be understood as being generic to all possible meanings supported by the specification and the word itself.

Therefore, the definitions of the words or elements of the following claims include not only the combination of elements which are literally set forth, but all equivalent structure, material, or acts for performing substantially the same function in the same way to obtain the same result. Therefore, it is contemplated that an equivalent substitution of two or more elements may be made for any of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A two-way foldable pickup truck box cover, comprising:
   a cover having a plurality of sequentially connected rigid panels configured to cover a truck bed;
   a pair of main bracket assembly mounted along side rails of the truck bed; and
   at least one auxiliary bracket configured to secure a selected rigid panel to the main bracket assembly via a slot track located on the auxiliary bracket; wherein
   the cover is configured to be folded in multiple directions, including a rear to front folding direction, a front to rear folding direction and a front and rear ends toward the center folding direction.

2. The two-way foldable pickup truck box cover of claim 1, wherein each of the plurality of rigid panels is individually lockable onto the main bracket assembly through the corresponding auxiliary bracket.

3. The two-way foldable pickup truck box cover of claim 1, wherein the auxiliary bracket is configured to be secured to the main bracket assembly via at least one screw and comprises a truck lock slot configured to receive an inner box edge of the truck bed.

4. The two-way foldable pickup truck box cover of claim 1, wherein the auxiliary bracket comprises a first auxiliary bracket member having a slot track and at least one elongated first securing slot, a second auxiliary bracket member having a truck lock slot and at least one elongated second securing slot, and at least one screw passing through the elongated first securing slot and the elongated second securing slot to secure the auxiliary bracket on the main bracket assembly.

5. The two-way foldable pickup truck cover of claim 1, wherein each of the rigid panels comprises a locking pin configured to selectively move forward or backward and selectively insert into a bottom slot track formed on the auxiliary bracket for locking each of the rigid panel with the auxiliary bracket.

6. The two-way foldable pickup truck cover of claim 1, wherein each of the rigid panels comprises a locking pin and a single rotary actuator to be rotated for engaging or disengaging locking pins of at least two adjacent rigid panels with bottom slot tracks formed on corresponding auxiliary brackets simultaneously.

7. The two-way foldable pickup truck cover of claim 1, wherein the plurality of sequentially connected rigid panels comprises a frontmost panel comprising a front mechanical lock configured to selectively lock the frontmost panel with the corresponding auxiliary bracket, a middle panel comprising a middle mechanical lock configured to selectively lock the middle panel with the corresponding auxiliary bracket, and a rearmost panel comprising a rear mechanical lock configured to selectively lock the rear panel with the corresponding auxiliary bracket.

8. The two-way foldable pickup truck cover of claim 1, wherein the plurality of sequentially connected rigid panels comprises a frontmost mechanical lock, a middle mechanical lock, and a rear mechanical lock, wherein each of the frontmost mechanical lock, the middle mechanical lock, and the rear mechanical lock comprises a retaining portion slidably coupled with the rigid panel and a locking hook configured to selectively lock into the slot track.

9. The two-way foldable pickup truck cover of claim 1, wherein the plurality of sequentially connected rigid panels are formed as a series of sequential panels and comprises a frontmost panel, a rearmost panel located at the opposite side of the frontmost panel, and a middle panel located between the frontmost panel and the rearmost panel.

10. The two-way foldable pickup truck cover of claim 1, during the rear to front folding direction, wherein a frontmost panel is locked on the auxiliary bracket and the remaining of the plurality of sequentially connected rigid panels are foldable in sequence towards the frontmost panel and configured to overlay one another to stack atop the locked frontmost panel.

11. The two-way foldable pickup truck cover of claim 1, during the rear to front folding direction, wherein a locking hook of the frontmost mechanical lock is secured into the slot track and locking hooks of a middle mechanical lock and a rearmost mechanical lock are not secured into the slot track.

12. The two-way foldable pickup truck cover of claim 1, during the front and rear ends toward the center folding direction, wherein a middle panel is locked on the auxiliary bracket and the remaining of the plurality of sequentially connected rigid panels are foldable to sequentially overlap toward the middle panel from opposite directions.

13. The two-way foldable pickup truck cover of claim 1, during the front and rear ends toward the center folding direction, wherein a locking hook of the middle mechanical lock is secured into the slot track and locking hooks of a frontmost mechanical lock and a rearmost mechanical lock are not secured into the slot track.

14. The two-way foldable pickup truck cover of claim 1, during the front-to-rear folding direction, wherein the rearmost panel is locked on the auxiliary bracket and the remaining of the plurality of sequentially connected rigid panels are foldable in sequence towards the rearmost panel and configured to overlay one another to stack atop the locked rearmost panel.

15. The two-way foldable pickup truck cover of claim 1, during front to rear folding direction, wherein a locking hook of the rearmost mechanical lock is secured into the slot track and locking hooks of a middle mechanical lock and a frontmost mechanical lock are not secured into the slot track.

16. The two-way foldable pickup truck cover of claim 1, wherein the rear-to-front folding direction and the front-to-rear folding direction are opposite directions.

17. The two-way foldable pickup truck cover of claim 1, during the rear to front folding direction, wherein a locking pin arranged on a frontmost panel is slid to be inserted into a bottom slot track formed on the auxiliary bracket to secure the frontmost panel on with the auxiliary bracket.

18. The two-way foldable pickup truck cover of claim 1, during front and rear ends toward the center folding direction, wherein a locking pin arranged on a middle panel is slid to be inserted into a bottom slot track of the auxiliary bracket to secure the middle panel with the auxiliary bracket.

19. The two-way foldable pickup truck cover of claim 1, during the front-to-rear folding direction, wherein a locking pin arranged on the rearmost panel is slid to be inserted into a bottom slot track of the auxiliary bracket to secure the rearmost panel with the auxiliary bracket.

20. The two-way foldable pickup truck cover of claim 1, wherein the cover does not include any integrated water drainage channel or pipe structure within the main bracket assembly.

* * * * *